(12) United States Patent
Nguyen et al.

(10) Patent No.: US 7,448,451 B2
(45) Date of Patent: Nov. 11, 2008

(54) METHODS FOR CONTROLLING MIGRATION OF PARTICULATES IN A SUBTERRANEAN FORMATION

(75) Inventors: Philip D. Nguyen, Duncan, OK (US); Richard D. Rickman, Duncan, OK (US); Ronald G. Dusterhoft, Katy, TX (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 231 days.

(21) Appl. No.: 11/092,210

(22) Filed: Mar. 29, 2005

(65) Prior Publication Data
US 2006/0219408 A1    Oct. 5, 2006

(51) Int. Cl.
*E21B 33/138* (2006.01)
*E21B 43/26* (2006.01)

(52) U.S. Cl. .............. 166/295; 166/278; 166/281; 166/292; 166/294; 166/300; 166/305.1; 507/219; 507/225; 507/237; 507/238; 507/261; 507/266; 507/268; 523/131

(58) Field of Classification Search .............. 166/278, 166/281, 292, 294, 295, 300, 305.1; 507/219, 507/225, 237, 238, 261, 266, 268; 523/131
See application file for complete search history.

(56) References Cited

U.S. PATENT DOCUMENTS

| | | | |
|---|---|---|---|
| 2,238,671 A | 4/1941 | Woodhouse | ............... 166/21 |
| 2,703,316 A | 3/1955 | Schneider | ............... 260/78.3 |
| 2,869,642 A | 1/1959 | McKay et al. | |
| 3,047,067 A | 7/1962 | Williams et al. | ............... 166/33 |
| 3,052,298 A | 9/1962 | Malott | |
| 3,070,165 A | 12/1962 | Stratton | |
| 3,123,138 A | 3/1964 | Robichaux | ............... 166/33 |

(Continued)

FOREIGN PATENT DOCUMENTS

CA    2063877    5/2003

(Continued)

OTHER PUBLICATIONS

U.S. Appl. No. 10/394,898, filed Mar. 21, 2003, Eoff et al (Ref. No. 2002-IP-009316U1).

(Continued)

*Primary Examiner*—George Suchfield
(74) *Attorney, Agent, or Firm*—Robert A. Kent; Baker Botts LLP (57) ABSTRACT

Methods of controlling particulate migration in a portion of a subterranean formation comprising placing a pre-flush fluid into the portion of the subterranean formation; and then, placing a low-viscosity adhesive substance diluted with an aqueous dissolvable solvent into the portion of the subterranean formation; wherein the portion of a subterranean formation being treated has a regain permeability of at least about 70%. Methods of creating a stabilized region around a portion of a subterranean formation around a well bore having a screen or liner in place in that portion of the subterranean formation comprising placing a pre-flush fluid into the portion of the subterranean formation; and then, placing a low-viscosity adhesive substance diluted with an aqueous dissolvable solvent into that portion of the subterranean formation; wherein the portion of a subterranean formation being treated has regain permeability of at least about 70%.

16 Claims, 1 Drawing Sheet

U.S. PATENT DOCUMENTS

| | | | |
|---|---|---|---|
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | 166/33 |
| 3,329,204 A | 7/1967 | Brieger | |
| 3,386,980 A | 8/1967 | Rike | 166/295 |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A * | 11/1969 | Hess et al. | 166/295 |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,709,641 A | 1/1973 | Sarem | |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,850,247 A | 11/1974 | Tinsley | |
| 3,854,533 A | 12/1974 | Gurley et al. | 166/276 |
| 3,857,444 A | 12/1974 | Copeland | 166/276 |
| 3,861,467 A | 1/1975 | Harnsberger | |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,933,205 A | 1/1976 | Kiel | |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | |
| 4,018,285 A * | 4/1977 | Watkins et al. | 166/295 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Stifferman et al. | |
| 4,085,802 A | 4/1978 | Sifferman et al. | |
| 4,089,437 A | 5/1978 | Chutter et al. | |
| 4,127,173 A | 11/1978 | Watkins et al. | |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/276 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |

| Patent No. | Date | Inventor | Class |
|---|---|---|---|
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar et al. | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,362 A | 9/1993 | Conally et al. | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,341,880 A | 8/1994 | Thorstensen et al. | |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Surles | |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,403,822 A | 4/1995 | Mueller et al. | |
| 5,420,174 A | 5/1995 | Dewprashad | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |

| Patent No. | Kind | Date | Inventor | Class |
|---|---|---|---|---|
| 5,921,317 | A | 7/1999 | Dewprashad et al. | 166/208 |
| 5,924,488 | A | 7/1999 | Nguyen et al. | 166/280 |
| 5,929,437 | A | 7/1999 | Elliott et al. | 250/259 |
| 5,944,105 | A | 8/1999 | Nguyen | 166/278 |
| 5,944,106 | A | 8/1999 | Dalrymple et al. | |
| 5,945,387 | A | 8/1999 | Chatterji et al. | 507/224 |
| 5,948,734 | A | 9/1999 | Sinclair et al. | 507/219 |
| 5,957,204 | A | 9/1999 | Chatterji et al. | 166/295 |
| 5,960,784 | A | 10/1999 | Ryan | |
| 5,960,877 | A | 10/1999 | Funkhouser et al. | |
| 5,960,878 | A | 10/1999 | Nguyen et al. | |
| 5,960,880 | A | 10/1999 | Nguyen et al. | 166/280 |
| 5,964,291 | A | 10/1999 | Bourne et al. | 166/279 |
| 5,969,006 | A | 10/1999 | Onan et al. | 523/166 |
| 5,969,823 | A | 10/1999 | Wurz et al. | |
| 5,977,283 | A | 11/1999 | Rossitto | 528/44 |
| 5,994,785 | A | 11/1999 | Higuchi et al. | 527/789 |
| RE36,466 | E | 12/1999 | Nelson et al. | 166/280 |
| 6,003,600 | A | 12/1999 | Nguyen et al. | 166/281 |
| 6,004,400 | A | 12/1999 | Bishop et al. | 134/2 |
| 6,006,835 | A | 12/1999 | Onan et al. | 166/295 |
| 6,006,836 | A | 12/1999 | Chatterji et al. | 166/295 |
| 6,012,524 | A | 1/2000 | Chatterji et al. | 166/295 |
| 6,016,870 | A | 1/2000 | Dewprashad et al. | 166/295 |
| 6,024,170 | A | 2/2000 | McCabe et al. | 166/300 |
| 6,028,113 | A | 2/2000 | Scepanski | 514/643 |
| 6,028,534 | A | 2/2000 | Ciglenec et al. | 340/856.2 |
| 6,040,398 | A | 3/2000 | Kinsho et al. | 525/527 |
| 6,047,772 | A | 4/2000 | Weaver et al. | 166/276 |
| 6,059,034 | A | 5/2000 | Rickards et al. | 166/280 |
| 6,059,035 | A | 5/2000 | Chatterji et al. | 166/293 |
| 6,059,036 | A | 5/2000 | Chatterji et al. | 166/294 |
| 6,063,738 | A | 5/2000 | Chatterji et al. | |
| 6,068,055 | A | 5/2000 | Chatterji et al. | 166/293 |
| 6,069,117 | A | 5/2000 | Onan et al. | 507/202 |
| 6,070,667 | A | 6/2000 | Gano | |
| 6,074,739 | A | 6/2000 | Katagiri | 428/323 |
| 6,079,492 | A | 6/2000 | Hoogteijling et al. | 166/276 |
| 6,098,711 | A | 8/2000 | Chatterji et al. | 166/294 |
| 6,114,410 | A | 9/2000 | Betzold | 523/130 |
| 6,123,871 | A | 9/2000 | Carroll | 252/301.36 |
| 6,123,965 | A | 9/2000 | Jacon et al. | 424/489 |
| 6,124,246 | A | 9/2000 | Heathman et al. | 507/219 |
| 6,130,286 | A | 10/2000 | Thomas et al. | 524/507 |
| 6,131,661 | A | 10/2000 | Conner et al. | |
| 6,135,987 | A | 10/2000 | Tsai et al. | 604/365 |
| 6,140,446 | A | 10/2000 | Fujiki et al. | 528/15 |
| 6,143,698 | A | 11/2000 | Murphey et al. | |
| 6,148,911 | A | 11/2000 | Gipson et al. | 166/248 |
| 6,152,234 | A | 11/2000 | Newhouse et al. | 166/403 |
| 6,162,766 | A | 12/2000 | Muir et al. | 507/267 |
| 6,165,947 | A | 12/2000 | Chang et al. | |
| 6,169,058 | B1 | 1/2001 | Le et al. | 507/222 |
| 6,172,011 | B1 | 1/2001 | Card et al. | 507/204 |
| 6,172,077 | B1 | 1/2001 | Curtis et al. | 514/278 |
| 6,176,315 | B1 | 1/2001 | Reddy et al. | 166/295 |
| 6,177,484 | B1 | 1/2001 | Surles | 523/131 |
| 6,184,311 | B1 | 2/2001 | O'Keefe et al. | 525/438 |
| 6,186,228 | B1 | 2/2001 | Wegener et al. | |
| 6,187,834 | B1 | 2/2001 | Thayer et al. | 522/15 |
| 6,187,839 | B1 | 2/2001 | Eoff et al. | |
| 6,189,615 | B1 | 2/2001 | Sydansk | 166/270 |
| 6,192,985 | B1 | 2/2001 | Hinkel et al. | 166/280 |
| 6,192,986 | B1 | 2/2001 | Urlwin-Smith | 166/295 |
| 6,196,317 | B1 | 3/2001 | Hardy | 166/276 |
| 6,202,751 | B1 | 3/2001 | Chatterji et al. | 166/276 |
| 6,209,643 | B1 | 4/2001 | Nguyen et al. | 166/276 |
| 6,209,644 | B1 | 4/2001 | Brunet | 166/297 |
| 6,209,646 | B1 | 4/2001 | Reddy et al. | 166/300 |
| 6,210,471 | B1 | 4/2001 | Craig | 106/31.08 |
| 6,214,773 | B1 | 4/2001 | Harris et al. | 507/271 |
| 6,231,664 | B1 | 5/2001 | Chatterji et al. | 106/724 |
| 6,234,251 | B1 | 5/2001 | Chatterji et al. | 166/295 |
| 6,238,597 | B1 | 5/2001 | Yim et al. | 252/512 |
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,302,207 | B1 | 10/2001 | Nguyen et al. | 166/276 |
| 6,306,998 | B1 | 10/2001 | Kimura et al. | 528/12 |
| 6,310,008 | B1 | 10/2001 | Rietjens | |
| 6,311,773 | B1 | 11/2001 | Todd et al. | 166/280 |
| 6,315,040 | B1 | 11/2001 | Donnelly | |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 | 12/2001 | Griffith et al. | 166/295 |
| 6,330,916 | B1 | 12/2001 | Rickards et al. | 166/280 |
| 6,330,917 | B2 | 12/2001 | Chatterji et al. | 166/295 |
| 6,342,467 | B1 | 1/2002 | Chang et al. | |
| 6,350,309 | B2 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |
| 6,372,678 | B1 | 4/2002 | Youngman et al. | 504/128 |
| 6,376,571 | B1 | 4/2002 | Chawla et al. | 522/64 |
| 6,387,986 | B1 | 5/2002 | Moradi-Araghi et al. | 523/211 |
| 6,390,195 | B1 | 5/2002 | Nguyen et al. | 166/276 |
| 6,394,181 | B2 | 5/2002 | Schnatzmeyer et al. | |
| 6,401,817 | B1 | 6/2002 | Griffith et al. | 166/295 |
| 6,405,796 | B1 | 6/2002 | Meyer et al. | |
| 6,405,797 | B2 | 6/2002 | Davidson et al. | 166/249 |
| 6,406,789 | B1 | 6/2002 | McDaniel et al. | 428/403 |
| 6,408,943 | B1 | 6/2002 | Schultz et al. | 166/285 |
| 6,415,509 | B1 | 7/2002 | Echols et al. | |
| 6,422,183 | B1 | 7/2002 | Kato | |
| 6,422,314 | B1 | 7/2002 | Todd et al. | 166/312 |
| 6,422,315 | B1 | | | |
| 6,439,309 | B1 | 8/2002 | Matherly et al. | 166/276 |
| 6,439,310 | B1 | 8/2002 | Scott, III et al. | 166/308 |
| 6,440,255 | B1 | 8/2002 | Kohlhammer et al. | 156/283 |
| 6,446,727 | B1 | 9/2002 | Zemlak et al. | 166/308 |
| 6,448,206 | B1 | 9/2002 | Griffith et al. | 507/219 |
| 6,450,260 | B1 | 9/2002 | James et al. | 166/277 |
| 6,454,003 | B1 | 9/2002 | Chang et al. | 166/270 |
| 6,457,518 | B1 | 10/2002 | Castano-Mears et al. | |
| 6,458,885 | B1 | 10/2002 | Stengal et al. | 524/507 |
| 6,478,092 | B2 | 11/2002 | Voll et al. | |
| 6,485,947 | B1 | 11/2002 | Rajgarhia et al. | 435/139 |
| 6,488,091 | B1 | 12/2002 | Weaver et al. | 166/300 |
| 6,488,763 | B2 | 12/2002 | Brothers et al. | 106/692 |
| 6,494,263 | B2 | 12/2002 | Todd | 166/312 |
| 6,503,870 | B2 | 1/2003 | Griffith et al. | 507/219 |
| 6,508,305 | B1 | 1/2003 | Brannon et al. | 166/293 |
| 6,510,896 | B2 | 1/2003 | Bode et al. | |
| 6,520,255 | B2 | 2/2003 | Tolman et al. | |
| 6,527,051 | B1 | 3/2003 | Reddy et al. | 166/300 |
| 6,528,157 | B1 | 3/2003 | Hussain et al. | 428/325 |
| 6,531,427 | B1 | 3/2003 | Shuchart et al. | 507/267 |
| 6,534,449 | B1 | 3/2003 | Gilmour et al. | |
| 6,536,939 | B1 | 3/2003 | Blue | |
| 6,538,576 | B1 | 3/2003 | Schultz et al. | 340/859.6 |
| 6,543,545 | B1 | 4/2003 | Chatterji et al. | 166/381 |
| 6,550,959 | B2 | 4/2003 | Huber et al. | |
| 6,552,333 | B1 | 4/2003 | Storm et al. | 250/269.3 |
| 6,554,071 | B1 | 4/2003 | Crook et al. | 166/293 |
| 6,555,507 | B2 | 4/2003 | Chatterji et al. | 507/219 |
| 6,569,814 | B1 | 5/2003 | Brady et al. | 507/201 |

| | | | |
|---|---|---|---|
| 6,582,819 B2 | 6/2003 | McDaniel et al. ............ 428/402 |
| 6,588,926 B2 | 7/2003 | Huber et al. |
| 6,588,928 B2 | 7/2003 | Huber et al. |
| 6,593,402 B2 | 7/2003 | Chatterji et al. ................ 524/7 |
| 6,599,863 B1 | 7/2003 | Palmer et al. ............... 507/219 |
| 6,608,162 B1 | 8/2003 | Chiu et al. ................... 528/129 |
| 6,609,578 B2 | 8/2003 | Patel et al. |
| 6,616,320 B2 | 9/2003 | Huber et al. .............. 366/156.2 |
| 6,620,857 B2 | 9/2003 | Valet ............................ 522/42 |
| 6,626,241 B2 | 9/2003 | Nguyen ...................... 166/278 |
| 6,632,527 B1 | 10/2003 | McDaniel et al. ............ 428/402 |
| 6,632,778 B1 | 10/2003 | Ayoub et al. ................ 507/202 |
| 6,632,892 B2 | 10/2003 | Rubinsztajn et al. ......... 525/476 |
| 6,642,309 B2 | 11/2003 | Komitsu et al. .............. 525/100 |
| 6,648,501 B2 | 11/2003 | Huber et al. ................ 366/301 |
| 6,659,179 B2 | 12/2003 | Nguyen ...................... 166/227 |
| 6,664,343 B2 | 12/2003 | Narisawa et al. ............. 525/474 |
| 6,667,279 B1 | 12/2003 | Hessert et al. ............... 507/225 |
| 6,668,926 B2 | 12/2003 | Nguyen et al. .............. 166/280 |
| 6,669,771 B2 | 12/2003 | Tokiwa et al. ............ 106/162.7 |
| 6,677,426 B2 | 1/2004 | Noro et al. |
| 6,681,856 B1 | 1/2004 | Chatterji et al. .............. 166/294 |
| 6,686,328 B1 | 2/2004 | Binder ......................... 510/446 |
| 6,705,400 B1 | 3/2004 | Nguyen et al. .............. 166/281 |
| 6,710,019 B1 | 3/2004 | Sawdon et al. ............... 507/136 |
| 6,713,170 B1 | 3/2004 | Kaneka et al. ............... 428/323 |
| 6,725,926 B2 | 4/2004 | Nguyen et al. ............ 166/254.1 |
| 6,725,930 B2 | 4/2004 | Boney et al. |
| 6,725,931 B2 | 4/2004 | Nguyen et al. ............ 166/280.2 |
| 6,729,404 B2 | 5/2004 | Nguyen et al. ............ 166/280.2 |
| 6,729,405 B2 | 5/2004 | DiLullo et al. |
| 6,732,800 B2 | 5/2004 | Acock et al. ................ 166/308 |
| 6,745,159 B1 | 6/2004 | Todd et al. ..................... 703/10 |
| 6,749,025 B1 | 6/2004 | Brannon et al. .......... 166/305.1 |
| 6,763,888 B1 | 7/2004 | Harris et al. ............... 166/305.1 |
| 6,766,858 B2 | 7/2004 | Nguyen et al. .............. 166/300 |
| 6,776,235 B1 | 8/2004 | England |
| 6,776,236 B1 | 8/2004 | Nguyen ...................... 166/279 |
| 6,832,650 B2 | 12/2004 | Nguyen et al. .............. 166/279 |
| 6,832,655 B2 | 12/2004 | Ravensbergen et al. |
| 6,837,309 B2 | 1/2005 | Boney et al. |
| 6,851,474 B2 | 2/2005 | Nguyen ...................... 166/279 |
| 6,866,099 B2 | 3/2005 | Nguyen |
| 6,881,709 B2 | 4/2005 | Nelson et al. |
| 6,887,834 B2 | 5/2005 | Nguyen et al. .............. 507/221 |
| 6,962,200 B2 | 11/2005 | Nguyen et al. |
| 6,978,836 B2 * | 12/2005 | Nguyen et al. .............. 166/295 |
| 6,997,259 B2 | 2/2006 | Nguyen |
| 7,013,976 B2 | 3/2006 | Nguyen et al. |
| 7,017,665 B2 | 3/2006 | Nguyen |
| 7,025,134 B2 | 4/2006 | Byrd et al. |
| 7,028,774 B2 | 4/2006 | Nguyen et al. |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,093,658 B2 | 8/2006 | Chatterji et al. |
| 7,104,325 B2 * | 9/2006 | Nguyen et al. .............. 166/295 |
| 7,114,560 B2 | 10/2006 | Nguyen et al. |
| 7,114,570 B2 * | 10/2006 | Nguyen et al. .............. 166/295 |
| 7,117,942 B2 | 10/2006 | Dalrymple et al. |
| 7,131,491 B2 | 11/2006 | Blauch et al. |
| 7,153,575 B2 | 12/2006 | Anderson et al. |
| 7,156,194 B2 | 1/2007 | Nguyen |
| 7,178,596 B2 | 2/2007 | Blauch et al. |
| 7,204,311 B2 | 4/2007 | Welton et al. |
| 7,210,528 B1 | 5/2007 | Brannon et al. |
| 7,216,711 B2 | 5/2007 | Nguyen et al. |
| 7,261,156 B2 | 8/2007 | Nguyen et al. |
| 7,273,099 B2 | 9/2007 | East, Jr. et al. |
| 7,281,581 B2 | 10/2007 | Nguyen et al. |
| 7,306,037 B2 | 12/2007 | Nguyen et al. |
| 7,343,973 B2 | 3/2008 | Dusterhoft et al. |
| 2001/0016562 A1 | 8/2001 | Muir et al. ................... 507/201 |
| 2002/0036088 A1 | 3/2002 | Todd |
| 2002/0043370 A1 | 4/2002 | Poe ........................ 166/250.07 |
| 2002/0048676 A1 | 4/2002 | McDaniel et al. ........... 428/404 |
| 2002/0070020 A1 | 6/2002 | Nguyen ...................... 166/295 |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. .......... 166/250.12 |
| 2003/0013871 A1 | 1/2003 | Mallon et al. |
| 2003/0060374 A1 | 3/2003 | Cooke, Jr. .................. 507/200 |
| 2003/0106690 A1 | 6/2003 | Boney et al. |
| 2003/0114314 A1 | 6/2003 | Ballard et al. ................ 507/100 |
| 2003/0114317 A1 | 6/2003 | Benton et al. |
| 2003/0130133 A1 | 7/2003 | Vollmer ...................... 507/100 |
| 2003/0131999 A1 | 7/2003 | Nguyen et al. .............. 166/280 |
| 2003/0148893 A1 | 8/2003 | Lungofer et al. ............. 507/200 |
| 2003/0186820 A1 | 10/2003 | Thesing ...................... 507/200 |
| 2003/0188766 A1 | 10/2003 | Banerjee et al. ................ 134/7 |
| 2003/0188872 A1 | 10/2003 | Nguyen et al. .............. 166/308 |
| 2003/0196805 A1 | 10/2003 | Boney et al. ................ 166/280 |
| 2003/0205376 A1 | 11/2003 | Ayoub et al. .............. 166/254.2 |
| 2003/0230408 A1 | 12/2003 | Acock et al. ................ 166/297 |
| 2003/0230431 A1 | 12/2003 | Reddy et al. |
| 2003/0234103 A1 | 12/2003 | Lee et al. .................... 166/293 |
| 2004/0000402 A1 | 1/2004 | Nguyen et al. .............. 166/280 |
| 2004/0014607 A1 | 1/2004 | Sinclair et al. ............... 507/200 |
| 2004/0014608 A1 | 1/2004 | Nguyen et al. .............. 507/200 |
| 2004/0040706 A1 | 3/2004 | Hossaini et al. ............. 166/278 |
| 2004/0040708 A1 | 3/2004 | Stephenson et al. ....... 166/280.1 |
| 2004/0040712 A1 | 3/2004 | Ravi et al. |
| 2004/0040713 A1 | 3/2004 | Nguyen et al. .............. 166/295 |
| 2004/0043906 A1 | 3/2004 | Heath et al. |
| 2004/0045712 A1 | 3/2004 | Eoff et al. |
| 2004/0048752 A1 | 3/2004 | Nguyen et al. .............. 507/269 |
| 2004/0055747 A1 | 3/2004 | Lee ............................ 166/278 |
| 2004/0060702 A1 | 4/2004 | Kotlar et al. |
| 2004/0106525 A1 | 6/2004 | Willbert et al. .............. 507/200 |
| 2004/0138068 A1 | 7/2004 | Rimmer et al. .............. 507/100 |
| 2004/0149441 A1 | 8/2004 | Nguyen et al. ........... 166/280.1 |
| 2004/0152601 A1 | 8/2004 | Still et al. .................... 507/100 |
| 2004/0152602 A1 | 8/2004 | Boles |
| 2004/0177961 A1 | 9/2004 | Nguyen et al. ............ 166/280.2 |
| 2004/0019496 A1 | 10/2004 | Nguyen et al. .............. 166/295 |
| 2004/0194960 A1 | 10/2004 | Nguyen et al. |
| 2004/0206499 A1 | 10/2004 | Nguyen et al. ........... 166/280.2 |
| 2004/0211559 A1 | 10/2004 | Nguyen et al. .............. 166/276 |
| 2004/0211561 A1 | 10/2004 | Nguyen et al. ........... 166/280.2 |
| 2004/0221992 A1 | 11/2004 | Nguyen et al. .............. 166/295 |
| 2004/0231845 A1 | 11/2004 | Cooke, Jr. ................... 166/279 |
| 2004/0231847 A1 | 11/2004 | Nguyen et al. .............. 166/295 |
| 2004/0256097 A1 | 12/2004 | Byrd et al. |
| 2004/0256099 A1 | 12/2004 | Nguyen et al. .............. 166/249 |
| 2004/0261993 A1 | 12/2004 | Nguyen |
| 2004/0261995 A1 | 12/2004 | Nguyen et al. .............. 166/279 |
| 2004/0261997 A1 | 12/2004 | Nguyen et al. .............. 166/281 |
| 2004/0261999 A1 | 12/2004 | Nguyen |
| 2005/0000694 A1 | 1/2005 | Dalrymple et al. |
| 2005/0000731 A1 | 1/2005 | Nguyen et al. ................ 175/57 |
| 2005/0006093 A1 | 1/2005 | Nguyen et al. .............. 166/281 |
| 2005/0006095 A1 | 1/2005 | Justus et al. |
| 2005/0006096 A1 | 1/2005 | Nguyen et al. .............. 166/295 |
| 2005/0028976 A1 | 2/2005 | Nguyen |
| 2005/0028979 A1 | 2/2005 | Brannon et al. |
| 2005/0034862 A1 | 2/2005 | Nguyen et al. |
| 2005/0034865 A1 | 2/2005 | Todd et al. |
| 2005/0045326 A1 | 3/2005 | Nguyen ...................... 166/278 |

| | | | |
|---|---|---|---|
| 2005/0045330 A1 | 3/2005 | Nguyen et al. | |
| 2005/0045384 A1 | 3/2005 | Nguyen | |
| 2005/0051322 A1 | 3/2005 | Nguyen et al. | |
| 2005/0051331 A1 | 3/2005 | Nguyen et al. | 166/280.2 |
| 2005/0059555 A1 | 3/2005 | Dusterhoft et al. | |
| 2005/0061509 A1 | 3/2005 | Nguyen | |
| 2005/0092489 A1 | 5/2005 | Welton et al. | |
| 2005/0126780 A1 | 6/2005 | Todd et al. | |
| 2005/0139359 A1 | 6/2005 | Maurer et al. | |
| 2005/0145385 A1 | 7/2005 | Nguyen | |
| 2005/0173116 A1 | 8/2005 | Nguyen et al. | |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194142 A1 | 9/2005 | Nguyen | |
| 2005/0197258 A1 | 9/2005 | Nguyen | |
| 2005/0207001 A1 | 9/2005 | Laufer et al. | |
| 2005/0263283 A1 | 12/2005 | Nguyen | |
| 2005/0267001 A1 | 12/2005 | Weaver et al. | |
| 2005/0269086 A1 | 12/2005 | Nguyen et al. | |
| 2005/0269101 A1 | 12/2005 | Stegent et al. | |
| 2005/0274510 A1 | 12/2005 | Nguyen et al. | |
| 2005/0274517 A1 | 12/2005 | Blauch et al. | |
| 2005/0277554 A1 | 12/2005 | Blauch et al. | |
| 2005/0284632 A1 | 12/2005 | Dalrymple et al. | |
| 2005/0284637 A1 | 12/2005 | Stegent et al. | |
| 2006/0048943 A1 | 3/2006 | Parker et al. | |
| 2006/0048944 A1 | 3/2006 | van Batenburg et al. | |
| 2006/0052251 A1 | 3/2006 | Anderson et al. | |
| 2006/0089266 A1 | 4/2006 | Dusterhoft et al. | |
| 2006/0113078 A1 | 6/2006 | Nguyen et al. | |
| 2006/0124303 A1 | 6/2006 | Nguyen et al. | |
| 2006/0157243 A1 | 7/2006 | Nguyen | |
| 2006/0175058 A1 | 8/2006 | Nguyen | |
| 2006/0219405 A1 | 10/2006 | Nguyen et al. | |

FOREIGN PATENT DOCUMENTS

| | | |
|---|---|---|
| EP | 0313243 B1 | 10/1988 |
| EP | 0528595 A1 | 8/1992 |
| EP | 0506934 | 10/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2298440 | 9/1996 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/009956 | 1/2004 |
| WO | WO 04/037946 A1 | 5/2004 |
| WO | WO 04/038176 A1 | 5/2004 |
| WO | WO 2004/083600 | 9/2004 |
| WO | WO2004090281 | 10/2004 |
| WO | WO2004104368 | 12/2004 |
| WO | WO 2005/021928 A2 | 3/2005 |
| WO | WO 2006103385 | 10/2006 |
| WO | WO 2007091007 | 8/2007 |

OTHER PUBLICATIONS

U.S. Appl. No. 10/601,407, filed Jun. 23, 2003, Byrd et al. (Ref. No.) 2003-IP-009867U1.

U.S. Appl. No. 10/603,492, filed Jun. 25, 2003, Nguyen et al (Ref. No. 2003-IP-00958U1).

U.S. Appl. No. 10/727,365, filed Dec. 4, 2003, Reddy, et al. (Ref. No. 2003-IP-011441).

U.S. Appl. No. 10/853,879, filed May, 26, 2004, Nguyen et al. (Ref. No. 960003U1).

Halliburton Technical Flier—Multi Stage Frac Completion Methods, 2 pages.

Halliburton "CobraFrac$^{SM}$ Service, Coiled Tubing Fracturing—Cost-Effective Method for Stimulating Untapped Reserves", 2 pages, 2004.

Halliburton "CobraJetFrac$^{SM}$ Service, Cost-Effective Technology That Can Help Reduce Cost per BOE Produced, Shorten Cycle time and Reduce Capex".

Halliburton Cobra Frac Advertisement, 2001.

Halliburton "SurgiFrac$^{SM}$ Service, a Quick and cost-Effective Method to Help Boost Production From Openhole Horizonal Completions", 2002.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polyactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.
McDaniel et al. "*Evolving New Stimulation Process Proves Highly Effective in Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled Injectrol® A Component:, 1999.
Halliburton brochure entitled "Injectrol® G Sealant", 1999.
Halliburton brochure entitled "Injectrol® IT Sealant", 1999.
Halliburton brochure entitled "Injectrol® Service Treatment", 1999.
Halliburton brochure entitled "Injectrol® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.
U.S. Appl. No. 10/383,154, filed Mar. 6, 2003, Nguyen, et al (Ref. No. 2002-IP-008592U1).
U.S. Appl. No. 10/408,800, filed Apr. 7, 2003, Nguyen, et al (Ref. No. 2003-IP-009380U1).
U.S. Appl. No. 10/649,029, filed Aug. 27, 2003, Nguyen, et al (Ref. No. 2003-IP-010303U1).
U.S. Appl. No. 10/650,063, filed Aug. 26, 2003, Nguyen (Ref. No. 2003-IP-010487U1).
U.S. Appl. No. 10/650,064, filed Aug. 26, 2003, Nguyen, et al (Ref. No. 2002-IP-007693U1).
U.S. Appl. No. 10/650065, filed Aug. 26, 2003, filed Aug. 26, 2003, Nguyen (Ref. No. 2002-IP-007051U1).
U.S. Appl. No. 10/659,574, filed Sep. 10, 2003, Nguyen, et al (Ref. No. 2003-IP-010789U1).
U.S. Appl. No. 10/751,593, filed Jan. 5, 2004, Nguyen (Ref. No. 2002-IP-008901U1).
U.S. Appl. No. 10/775,347, filed Feb. 10, 2004, Nguyen (Ref. No. 2003-IP-009585U1).
U.S. Appl. No. 10/791,944, filed Mar. 3, 2004, Nguyen (Ref. No. 2003-IP-012126U1).
U.S. Appl. No. 10/793,711, filed Mar. 5, 2004, Nguyen, et al (Ref. No. 2004-IP-013096U1).
U.S. Appl. No. 10/852,811, filed May 25, 2004, Nguyen (Ref. No. 2003-IP-012726U1).
U.S. Appl. No. 10/860,951, filed Jun. 4, 2004, Stegent, et al (Ref. No. 2003-IP-012157U2).
U.S. Appl. No. 10/861,829, filed Jun. 4, 2004, Stegent, et al (Ref. No. 2003-IP-012157U1).
U.S. Appl. No. 10/862,986, filed Jun. 8, 2004, Nguyen, et al (Ref. No. 2003-IP-011526U1).
U.S. Appl. No. 10/864,061, filed Jun. 9, 2004, Blauch, et al (Ref. No. 2003-IP-012485U1).
U.S. Appl. No. 10/864,818, filed Jun. 9, 2004, Blauch, et al (Ref. No. 2003-IP-012486U1).
U.S. Appl. No. 10/868,593, filed Jun. 15, 2004, Nguyen, et al (Ref. No. 2001-IP-005859U1P5).
U.S. Appl. No. 10/868,608, filed Jun. 15, 2004, Nguyen, et al (Ref. No. 2003-IP-011518U1).
U.S. Appl. No. 10/937,076, filed Sep. 9, 2004, Nguyen, et al (Ref. No. 2004-IP-015015U1).
U.S. Appl. No. 10/944,973, filed Sep. 20, 2004, Nguyen, et al (Ref. No. 2003-IP-009380U1P1).
U.S. Appl. No. 10/972,648, filed Oct. 25, 2004, Dusterhoft, et al (Ref. No. 2002-IP-009142U1P4).
U.S. Appl. No. 10/977,673, filed Oct. 29, 2004, Nguyen (Ref. No. 2003-IP-010487U1P1).
U.S. Appl. No. 11/009,277, filed Dec. 8, 2004, Welton, et al (Ref. No. 2003-IP-010303U1P1).
U.S. Appl. No. 11/011,394, filed Dec. 12, 2004, Nguyen, et al (Ref. No. 2004-IP-013299U1).
U.S. Appl. No. 11/035,833, filed Jan. 14, 2005, Nguyen (Ref. No. 2004-IP-014501U1).
U.S. Appl. No. 11/049,252, filed Feb. 2, 2005, Van Batenburg, et al (Ref. No. 2004-IP-015015U1P1).
U.S. Appl. No. 11/053,280, filed Feb. 8, 2005, Nguyen (Ref. No. 2004-IP-015507U1).
Halliburton, *CoalStim$^{SM}$ Service, Helps Boost Cash Flow From CBM Assets, Stimulation*, HO3679 Oct. 2003, 2003, Halliburton Communications, 2003.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications, 2003.
Halliburton, *Expedite® Service, A Step-Change Improvement Over Conventional; Proppant Flowback Control Systems. Provides Up to Three Times the Conductivity of RCPs.*, Stimulation, HO3296 May 2004, 2004, Halliburton Communications, 2004.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications, 2004.
Office Action from U.S. Appl. No. 11/352,133, filed Jan. 17, 2008.
Foreign Search Report, Mar. 7, 2007.
Al-Anazi, et al., "A Successful Methanol Treatment in a Gas-Condensate Reservoir: Field Application," SPE 80901A Successful Methanol Treatment, 2003.
Almond et al., *Factors Affecting Proppant Flowback with Resin Coated Proppants*, SPE 30096, pp. 171-186, May 1995.
Al-Anazi, et al. "Laboratory Measurements of Condensate Blocking and Treatment for Both Low and High Permeability Rocks," SPE paper 77546, 2002.
U.S. Appl. No. 12/080,647, Published Apr. 04, 2008, Dalrymple et al., filed Apr. 04, 2008.
"Santrol Bioballs"; http://www.fairmounminerals.com/.sub.-SANTROL/SANTROL%20Web%20Site/B.sub-.--TD.htm. cited by other, filed Sep. 30, 2004.
Foreign communication from a related counterpart application, filed Sep. 16, 2004.
Foreign Search Report and Written Opinion PCT/GB2005/004009, filed Jan. 11, 2006.
Foreign Search Report and Opinion (PCT Appl. No. GB2004/001497), filed Jul. 20, 2004.
Foreign Search Report and Opinion (PCT Appl. No. GB2004/001842), filed Dec. 10, 2004.
Foreign Search Report and Opinion (PCT Appl. No. GB2004/002674), filed Dec. 16, 2004.
Foreign Search Report and Opinion (PCT Appl. No. GB2004/002968), filed Nov. 16, 2004.
Foreign Search Report and Opinion (PCT Appl. No. GB2004/004242), filed Feb. 10, 2005.
Foreign Search Report and Opinion (PCT Appl. No. GB2004-000689), filed Jun. 04, 2004.
Foreign Search Report and Opinion (PCT/GB2004/002727), filed Mar. 11, 2005.
Foreign Search Report and Opinion (PCT/GB/2004/002747), filed Mar. 11, 2005.
Foreign Search Report and Opinion PCT/GB2005/004010, filed Feb. 21, 2006.

Foreign Search Report and Written Opinion for PCT/GB2006/000366, filed Jun. 22, 2006.
Foreign Search Report PCT/GB2005/003747, filed Dec. 12, 2005.
Halliburton brochure entitled "CobraFrac Service, Cost-Effective Technology That Can Help Reduce Cost per BOE Produced, Shorten Cycle Time and Reduce Capex", filed 2001.
International Search Report PCT/GB2004/002948, filed May 24, 2005.
International Search Report PCT/GB2005/000637, filed Jun. 02, 2005.
International Search Report, PCT/GB2005/000634, filed Jun. 08, 2005.

SPE 17154 Paccaloni Key Factors for Enhanced Results of Matrix Stimulation Treatments, Paccaloni et al., Society of Petroleum Engineers, filed Feb. 08, 1988.
SPE 20623 Paccaloni, Advances in Matrix Stimulation Technology, Paccaloni et al, JPT, filed Mar. 1993.
SPE 82215, Controlling Proppant Flowback in High-Temperature, High-Production Wells. Nguyen et al., Society of Petroleum Engineers, Inc, filed May 13, 2003.
SPE 90398, Maximizing Effective Proppant Permeability under High-Stress, High Gas-Rate Conditions. Dusterhoft, R., Nguyen, P., Conway, M, filed Sep. 2004.

* cited by examiner

METHODS FOR CONTROLLING MIGRATION OF PARTICULATES IN A SUBTERRANEAN FORMATION

BACKGROUND

The present invention relates to methods for controlling the migration of particulates, such as proppant and formation sands, in subterranean formations using low viscosity solutions of adhesive substances.

Hydrocarbon wells are often located in subterranean zones that contain unconsolidated particulates that may migrate within the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. As used herein, the term "unconsolidated," when used to refer to a portion of a subterranean formation, refers to portions that contain loose particulates and portions that contain bonded particulates that have insufficient bond strength to withstand the forces produced by the production of fluids through the zones.

One method of controlling particulates in unconsolidated formations involves placing a filtration bed containing gravel near the well bore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a well bore. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a viscous treatment fluid. Once the gravel is placed in the well bore, the viscosity of the treatment fluid is reduced, and it is returned to the surface. Some gravel packing operations, commonly known as "high-rate water packing" operations, the treatment fluid viscosity is somewhat lowered and yet the gravel remains in suspension because the treatment occurs at a substantially higher velocity. Gravel packs act, inter alia, to stabilize the formation while causing minimal impairment to well productivity. The gravel, inter alia, acts to prevent formation particulates from occluding the screen or migrating with the produced fluids, and the screen, inter alia, acts to prevent the gravel from entering the production tubing. Such packs may be time consuming and expensive to install. Due to the time and expense needed it is sometimes desirable to place a screen without the gravel and, particularly in cases in which an expandable screen is being placed, it may be unrealistic to place a bed of gravel between the expandable screen and the well bore. Even in circumstances in which it is practical to place a screen without gravel, it is often difficult to determine an appropriate screen size to use as formation sands tend to have a wide distribution of sand grain sizes. When small quantities of sand are allowed to flow through a screen formation erosion becomes a significant concern. As a result, the placement of gravel as well as the screen is often necessary to assure that the formation sands are controlled.

Another method used to control particulates in unconsolidated formations involves consolidating unconsolidated subterranean producing zones into stable, permeable masses by applying a resin followed by a spacer fluid, a catalyst, and an after-flush fluid. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst an exothermic reaction occurs that may result in rapid polymerization, potentially damaging the formation by plugging the pore channels, halting pumping when the well bore is plugged with solid material, or resulting in a down hole explosion as a result of the heat of polymerization. Also, using these conventional processes to treat long intervals of unconsolidated regions is not practical due to the difficulty in determining if the entire interval has been successfully treated with both the resin and the external catalyst.

Another method used to control particulates in unconsolidated formations involves consolidating unconsolidated subterranean producing zones into stable, permeable masses by applying a pre-flush solution to the a portion of the subterranean formation followed by placing a low viscosity resin or a tackifier and followed by placing an after-flush into the formation to restore the permeability of the formation. Failure to place an after-flush in the portion of the formation being treated was known to result in a reduction in the overall permeability of the portion of the formation. As liquid production from a formation is related to the formation's permeability this was highly undesirable.

BRIEF DESCRIPTION OF THE DRAWINGS

Some specific example embodiments of the disclosure may be understood by referring, in part, to the following description and the accompanying drawings.

SUMMARY OF THE INVENTION

The present invention relates to methods for controlling the migration of particulates, such as proppant and formation sands, in subterranean formations using low viscosity solutions of adhesive substances.

One embodiment of the present invention provides methods of controlling particulate migration in a portion of a subterranean formation comprising placing a pre-flush fluid into the portion of the subterranean formation; and then, placing a low-viscosity adhesive substance diluted with an aqueous dissolvable solvent into the portion of the subterranean formation; wherein the portion of a subterranean formation being treated has a regain permeability of at least about 70%.

Another embodiment of the present invention provides methods of creating a stabilized region around a portion of a subterranean formation around a well bore having a screen or liner in place in that portion of the subterranean formation comprising placing a pre-flush fluid into the portion of the subterranean formation; and then, placing a low-viscosity adhesive substance diluted with an aqueous dissolvable solvent into that portion of the subterranean formation; wherein the portion of a subterranean formation being treated has regain permeability of at least about 70%.

Other and further objects, features and advantages of the present invention will be readily apparent to those skilled in the art upon a reading of the description of preferred embodiments which follows.

DESCRIPTION OF PREFERRED EMBODIMENTS

The present invention relates to methods for controlling the migration of particulates, such as proppant and formation sands, in subterranean formations using low-viscosity solutions of adhesive substances.

One embodiment of the present invention describes a method of controlling particulates in a subterranean formation comprising placing a pre-flush fluid into a portion of a subterranean formation, and then placing a low-viscosity solution of an adhesive substance into the portion of a subterranean formation. The methods of the present invention do not make use of an after-flush fluid and yet do not suffer reduced permeability to the portion of the subterranean formation. In previously known methods of consolidating particulates within a subterranean formation it was necessary to place an after-flush solution soon after placing the adhesive substance in order to prevent the adhesive substance from occupying a significant portion of the reservoir porosity and thus causing a loss in permeability. However, it has been found in the present invention that placing a relatively small amount of adhesive substance diluted in a carefully selected aqueous dissolvable solvent will create an effect whereby formation water is drawn into the solvent and adhesive substance is drawn to the formation surface, thus placing a thin layer of the adhesive substance on the surfaces with in the treated formation. The material left in the pore spaces after the adhesive substance has deposited is a mixture of solvent and formation water that does not substantially hinder the reservoir permeability. In fact, in some cases changes in capillary pressure and surface tension may actually result in an increase in permeability to hydrocarbon fluids.

The methods of the present invention are able to place an adhesive substance without an after-flush and achieve a regain permeability of at least about 70%. The term "regain permeability" refers to the percentage of permeability of a portion of a subterranean formation following treatment; that is, it is a percentage of the post-treatment permeability as compared to the pre-treatment permeability. In some embodiments of the present invention the regain permeability is at least about 75%. In other embodiments of the present invention the regain permeability is at least about 80%. In still other embodiments of the present invention the regain permeability is at least about 85%. In still other embodiments of the present invention the regain permeability is at least about 90%. By eliminating the need for an after-flush step the methods of the present invention become more economical to perform and they become much less likely to damage the formation being treated. Moreover, while it has been widely believed that simple placement of a low-viscosity resin composition would not yield enough mechanical strength to support the formation, the methods of the present invention are capable of substantially stabilizing the particulates such that loose or weakly consolidated particulates are prevented from shifting or migrating once the treatment is complete. This is particularly significant in the context of portions of formations wherein it is desirable to control the particulates without having to use a gravel pack. In such situations the methods of the present invention, preferably coupled with the use of a screen or liner (which may be an expandable or traditional screen or a perforated or slotted liner, or any similar device known in the art) may act to control particulates to a high enough degree that a gravel pack becomes unnecessary. Thus, in the methods of the present invention that both a low-viscosity adhesive substance and a screen/liner, the screen/liner may be used, inter alia, to provide mechanical support to prevent bore hole collapse while the low-viscosity adhesive substance, inter alia, creates a stable, permeable region around the well bore that resists particulate migration. Such embodiments may act to make the use of screen-only or liner-only (no gravel pack) completions functional over a much wider range of formation properties than previously thought possible.

The methods of the present invention may be used in a wide variety of particulate control operations. For example, they may be used on a well bore having a screen or liner in place wherein the pre-flush fluid and the low-viscosity adhesive substance are placed in the formation by injecting them directly through the screen or liner. In addition, they may be used on a well bore having a gravel pack in place (with or without a screen or liner in place) wherein the pre-flush fluid and the low-viscosity adhesive substance are placed in the formation by injecting them directly through the gravel pack as a means to prevent damage due to formation fines migration or as a remedial treatment to cure a sand production problem. In addition, they may be used to help reduce proppant flowback from a propped fracture by placing the pre-flush fluid and the low-viscosity adhesive substance into the portion of the subterranean formation so as to displace and push the unconsolidated particulates (be they proppant or formations fines) into the formation or deeper into the proppant pack and holding them in place with the adhesive substance once the operation is complete.

Suitable pre-flush fluids comprise either a hydrocarbon liquid or a mixture of an aqueous liquid and a surfactant. The pre-flush fluid acts to prepare the formation particulates to accept the adhesive substance. Any pre-flush fluid compatible with the later-used adhesive substance and capable of facilitating the coating of the adhesive substance on the subterranean particles and surfaces and aiding the adhesive substance in flowing to the contact points between adjacent particulates in the formation may be used in the present invention. Formations suitable for treatment with the methods of the present invention are generally water wet, and by using either a hydrocarbon pre-flush fluid or an aqueous pre-flush fluid with an appropriate surfactant, the formation may be made ready to accept the placement of the adhesive substance.

Where a hydrocarbon pre-flush fluid is used, suitable fluids include liquid hydrocarbon fluids such as kerosene, diesel, crude oil, hydrocarbon-based solvents such as xylene, hydrocarbon-based condensates, hydrocarbon-based distillates, and combinations thereof. Generally, a desirable pre-flush has a relatively low cost and low viscosity and minimizes safety concerns, for these reasons kerosene and diesel may be preferred hydrocarbon pre-flush fluids in the methods o the present invention.

Where an aqueous pre-flush fluid is used, the aqueous liquid component may be fresh water, salt water (e.g., water containing one or more salts dissolved therein), brine, seawater, or any other aqueous liquid that does not adversely react with the other components used in accordance with this invention or with the subterranean formation. Surfactants suitable for inclusion in the aqueous pre-flush fluids include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$-$C_{22}$ alkyl phosphonate surfactant is preferred. The surfactant or surfactants used are included in the aqueous liquid in an amount sufficient to prepare the subterranean formation to receive a treatment of an adhesive substance by wetting the particulates in the formation so that the resin can attach to those particulates. In some embodiments of the present invention, the aqueous pre-flush fluid comprises surfactant in an amount ranging from about 0.1% to about 15% by weight of the aqueous liquid.

Adhesive substances suitable for use in the present invention include non-aqueous tackifying agents; silyl-modified polyamides; and curable resin compositions. Selection of an appropriate adhesive substance is related, at least in part, to the forces that the treated portion of the formation will be subjected to during production. For example, in a portion of a subterranean formation that is expected to be subjected to relatively low fluid flow rates, the lower the drag forces on the particulate materials may mean that use of a non-aqueous tackifying agent may sufficiently control the particulates. Similarly, at relatively high flow rates a resin may be better suited to provide adequate cohesion between the formation particulates.

Non-aqueous tackifying agents suitable for use in the consolidation fluids of the present invention comprise any compound that, when in liquid form or in a solvent solution, will form a non-hardening coating upon a particulate. A particularly preferred group of non-aqueous tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying compound to form a hardened coating. A "hardened coating" as used herein means that the reaction of the non-aqueous tackifying compound with the multifunctional material will result in a substantially non-flowable reaction product that exhibits a higher compressive strength in a consolidated agglomerate than the non-aqueous tackifying compound alone on the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the non-aqueous tackifying compound in an amount of from about 0.01 to about 50 percent by weight of the non-aqueous tackifying agent to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al:, the relevant disclosure of which is herein incorporated by reference. Other suitable tackifying agents are described in U.S. Pat. No. 5,853,048 issued to Weaver, et al.

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

Resins suitable for use as an adhesive substance in the methods of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. An epoxy resin may be preferred when using the methods of the present invention in formations having temperatures ranging from about 65° F. to about 350° F. and a furan resin may be preferred when using the methods of the present invention in formations having temperatures above about 300° F.

In order for the adhesive substance used in the present invention to achieve a low enough viscosity to be suitable for use in the present invention, a solvent may be needed. The methods of the present invention call for the viscosity of the adhesive substance to be less than about 100 cP. In some embodiments the viscosity is less than about 50 cP, in other embodiments the viscosity is less than about 10 cP, in still other embodiments the viscosity is less than about 5 cP. It is within the ability of one skilled in the art, with the benefit of this disclosure, to determine how much solvent is needed to achieve a viscosity suitable to the subterranean conditions.

Solvents suitable for use with the adhesive substances used in the present invention comprise aqueous dissolvable solvents that are compatible with the chosen adhesive substance and that are capable of achieving the desired viscosity effect. When exposed to water within a subterranean formation, a suitable aqueous dissolvable solvent will have a higher affinity to the water than to the adhesive substance and, as a result, the adhesive substance will be deposited on formation surfaces as the water is drawn away. The solvents that can be used in the present invention preferably include those having high flash points (most preferably above about 125° F.). Examples of solvents suitable for use in the present invention include, but are not limited to, ethanol, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, furfuryl aldehyde, butyl lactate, fatty acid methyl esters, and combinations thereof. Selection of the solvent is related to, among other things, the chosen adhesive substance. For example, where an epoxy resin is used an ethanol solvent may be preferred whereas when a furan resin is used an isopropyl alcohol or furfuryl aldehyde solvent may be preferred. Moreover, depending upon the desired adhesive substance viscosity (and this the required amount of dilution with solvent), the optimum solvent may differ. For example, when using an epoxy resin in combination with a solvent, methanol may be suitable for dilutions up to about 50% epoxy resin and 50% methanol solvent, but when a greater percentage of solvent is needed methanol may be unsuitable because at dilutions greater than about 50% the epoxy resin may not disperse properly in the methanol solvent. By contrast, ethanol may be a suitable solvent for use with an epoxy resin at dilutions as high at 90% ethanol solvent to 10% epoxy resin. It is within the ability of one skilled in the art, with the benefit of this disclosure, to select an appropriate solvent to achieve a viscosity suitable to the subterranean conditions.

The pre-flush fluid and low-viscosity adhesive substance are preferably introduced to the subterranean formation at a matrix flow rate. That is, the fluids are added at such a rate that they are able to penetrate the formation without substantially affecting the structure of the formation sands or proppant matrixes they encounter.

To facilitate a better understanding of the present invention, the following examples of some of the preferred embodiments are given. In no way should such examples be read to limit the scope of the invention.

EXAMPLES

Example 1

Four sand sample test cores were created to simulate unconsoldiated formation sand materials. Two used synthetic sand (88% by weight 70/170 mesh sand, 10% by weight silica flour, and 2% by weight smectite) and two used Brazos river sand. The sands were packed into individual flow cells of 4.5 inches in length and 1 inch in diameter.

The low-viscosity adhesive substance used was a two-component epoxy resin comprised of 0.5 parts of hardenable resin component, 0.5 parts of hardening agent component, and 10 parts ethanol as solvent.

Initially the sample cells were saturated with a diesel pre-flush fluid and the initial permeability was determined. Next, the samples were flushed with the low-viscosity adhesive substance. Some of the samples were then treated with an after-flush treatment by using 1 pore volume of diesel. The treated sand packs were allowed to cure for 20 hours at 175° F. Next the samples were tested to determine their permeability and unconfined compressive strength (UCS). The results are shown in Table 1, below:

TABLE 1

Testing regained permeability.

| Sand Sample | Amount of Resin Flush (in pore volumes) | After-flush? | UCS (psi) | % regained permeability |
|---|---|---|---|---|
| Synthetic #1 | 2 | No | 96 | 97 |
| Synthetic #2 | 1 | Yes | est. 5–10 | 98 |
| Brazos #1 | 2 | No | 43 | 81 |
| Brazos #2 | 2 | Yes | est. 5–10 | 96 |

As can be seen in the results from Table 1, the methods of the present invention (embodied in the results from Synthetic #1 and Brazos #1) show that the present invention is capable of providing consolidation without significant loss of permeability

Example 2

A consolidated Berea core with dimensions of 2.5 inches in length and 1 inch in diameter was installed in a Hassler sleeve under a confining pressure of 150 psi. Initially core was saturated with a diesel pre-flush fluid and the initial permeability was determined. Next, the core was flushed with the low-viscosity adhesive substance (the same adhesive substance used in Example 1) and allowed to cure for 20 hours at 175° F. without an after-flush treatment. The core was tested to determine its permeability once the resin had had time to cure.

The initial permeability of the core was determined to be 98 mD, and the after treatment permeability was found to be 79 mD, a regain permeability of about 81%; thus, the methods of the present invention are capable of providing consolidation without significant loss of regain permeability even without an after-flush treatment.

Example 3

Figure 1:
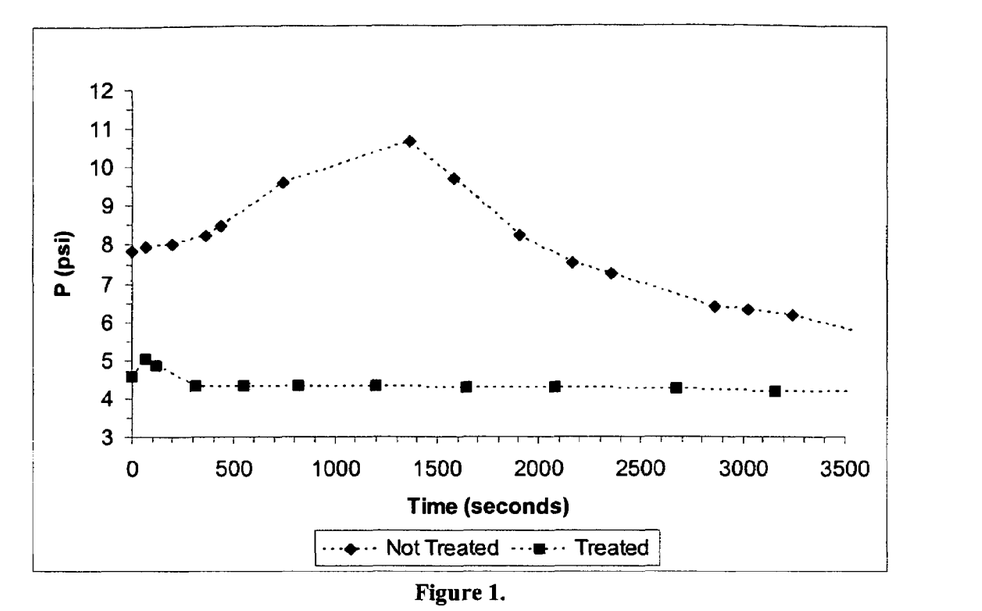
FIG. 1 shows a plot of pressure versus time for the experiment described in Example 3.

Flow tests were performed with unconsolidated formation material packed against a sand control screen. The test showed that the untreated formation material initially caused plugging and formation damage that caused an increase in differential pressure, followed by material being produced through the screen the caused a decreasing trend in differential pressure. In real life with severe well conditions of high flow rates, this could be enough to cause catastrophic failure to the screen due to erosion. The formation sample stabilized using the new resin technique showed no signs of plugging, fines migration nor solids production through the screen during the course of the test. The differential pressure for this test stayed nearly constant for the duration of the test and was significantly less than that for the non-stabilized sample at any point in the test. The results of the test showing pressure over time are shown in FIG. 1. The following procedure was used:

Synthetic formation sand was prepared to simulate unconsolidated formation sand materials by mixing 88% by weight 70/170 mesh sand, 10% by weight silica flour, and 2% by weight smectite into a homogeneous sand mixture. A 6-gauge wire-wrapped screen coupon with 15/16-inch diameter was first inserted into a flow-through cylinder. The simulated formation sand material (100 grams) was then packed against the screen, and 12/20-mesh Brady sand (60 grams) was placed on top of simulated formation material. The cylinder was then saturated with 3% KCl brine by flowing the solution through the screen towards the formation. Next, a 60-mL volume of a diluted 2-component epoxy resin system (0.5 parts of hardenable resin component, 0.5 parts of hardening agent component, and 10 parts of ethanol solvent) was injected in the same direction through the screen to treat the simulated formation sand. The viscosity of the diluted resin was less than about 1 cP. The entire system was then put in oven for curing at 150° F. for 20 hours. After that time, 3% KCl was flowed through the formation material and screen at a constant rate of 6 mL/min (in reverse direction to simulate the well producing) while the pressure necessary to maintain this flow rate was monitored. For the control (labeled "Not Treated" in the Figure), the entire test was performed without the treatment of low-viscosity resin.

Example 4

Figure 2:
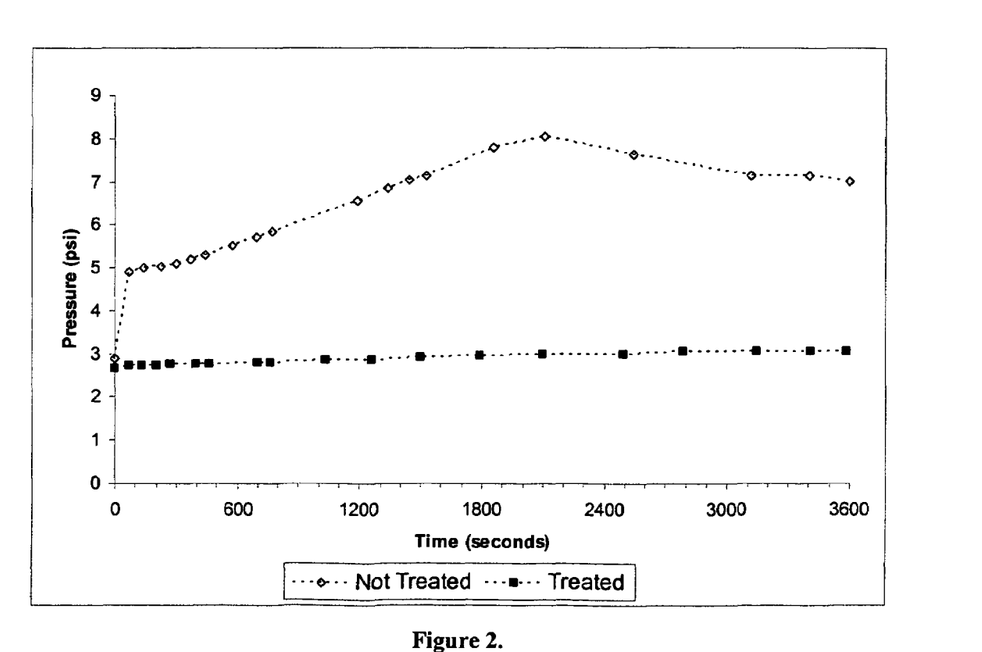
FIG. 2 shows a plot of pressure versus time for the experiment described in Example 4.

The test performed in Example 3 was repeated but a 4-gauge wire-wrapped screen coupon was used. FIG. 2 shows the pressure profile during production simulation. For the control (labeled "Not Treated" in the Figure), the entire test was performed without the treatment of diluted resin. The differential pressure for this test stayed nearly constant for the duration of the test and was significantly less than that for the non-stabilized sample at any point in the test.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method comprising:
    placing a pre-flush fluid into a portion of a subterranean formation; and then,
    placing a low-viscosity adhesive substance diluted with an aqueous dissolvable solvent to have a viscosity of less than about 100 cP into the portion of the subterranean formation; and
    allowing the low-viscosity adhesive substance to contact at least a portion of fines or sands residing in the portion of the subterranean formation;
    wherein the portion of the subterranean formation being treated has a regain permeability of at least about 70%;
    wherein the low-viscosity adhesive substance comprises a non-aqueous tackifying agent that further comprises a multifunctional material in an amount of from about 0.01% to about 50% by weight of the non-aqueous tackifying agent and wherein the multifunctional material comprises at least one multifunctional material selected from the group consisting of an aldehyde, a dialdehyde, an aldehyde releasing compound, a dihalide, a polyacid anhydride, an epoxide, a furfuraldehyde, a glutaraldehyde condensate, an aldehyde condensate, and any combination thereof.

2. The method of claim 1 wherein the pre-flush fluid comprises at least one hydrocarbon liquid selected from the group consisting of kerosene, diesel, crude oil, a hydrocarbon-based solvent, a hydrocarbon-based condensate, a hydrocarbon-based distillate, and any combination thereof.

3. The method of claim 1 wherein the pre-flush fluid comprises an aqueous liquid and a surfactant and wherein the pre-flush fluid comprises from about 0.1% to about 15% surfactant by weight of the aqueous liquid and wherein the surfactant comprises at least one surfactant selected from the group consisting of an ethoxylated nonyl phenol phosphate ester, a cationic surfactant, a non-ionic surfactant, an alkyl phosphonate surfactant, and any combination thereof.

4. The method of claim 1 wherein the adhesive substance further comprises at least one adhesive substance selected from the group consisting of a silyl-modified polyamide, a curable resin, and any combination thereof.

5. The method of claim 1 wherein the non-aqueous tackifying agent comprises a condensation reaction of a polyacid and a component selected from the group consisting of a polyamine, a polyester, a polycarbonate, a polycarbamate, a natural resin, and any combination thereof.

6. The method of claim 4 wherein the silyl-modified polyamide comprises at least one silyl-modified polyamide selected from the group consisting of a reaction product of a silating compound and a polyamide, a reaction product of a silating compound and a mixture of polyamides, and any combination thereof.

7. The method of claim 4 wherein the curable resin comprises at least one curable resin selected from the group consisting of a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and any combination thereof.

8. The method of claim 1 wherein the aqueous dissolvable solvent comprises at least one solvent selected from the group consisting of ethanol, a butylglycidyl ether, a dipropylene glycol methyl ether, a butyl bottom alcohol, a dipropylene glycol dimethyl ether, a diethyleneglycol methyl ether, an ethyleneglycol butyl ether, methanol, butyl alcohol, isopropyl alcohol, a diethyleneglycol butyl ether, propylene carbonate, d-limonene, 2-butoxy ethanol, butyl acetate, furfuryl acetate, butyl lactate, a fatty acid methyl ester, and any combination thereof.

9. A method comprising:
    placing a pre-flush fluid into a portion of a subterranean formation; and then,
    placing a low-viscosity adhesive substance diluted with an aqueous dissolvable solvent to have a viscosity of less than about 100 cP into the portion of the subterranean formation;

wherein the portion of the subterranean formation being treated has a regain permeability of at least about 70% without the introduction of a substantial amount of an after-flush fluid into the portion of the subterranean formation; and wherein the low-viscosity adhesive substance comprises a non-aqueous tackifying agent that further comprises a multifunctional material in an amount of from about 0.01% to about 50% by weight of the non-aqueous tackifying agent and wherein the multifunctional material comprises at least one multifunctional material selected from the group consisting of an aldehyde, a dialdehyde, an aldehyde releasing compound, a dihalide, a polyacid anhydride, an epoxide, a furfuraldehyde, a glutaraldehyde condensate, an aldehyde condensate, and any combination thereof.

10. The method of claim 9 wherein the pre-flush fluid comprises at least one hydrocarbon liquid selected from the group consisting of kerosene, diesel, crude oil, a hydrocarbon-based solvent, a hydrocarbon-based condensate, a hydrocarbon-based distillate, and any combination thereof.

11. The method of claim 9 wherein the pre-flush fluid comprises an aqueous liquid and a surfactant and wherein the pre-flush fluid comprises from about 0.1% to about 15% surfactant by weight of the aqueous liquid and wherein the surfactant comprises at least one surfactant selected from the group consisting of an ethoxylated nonyl phenol phosphate ester, a cationic surfactant, a non-ionic surfactant, an alkyl phosphonate surfactant, and any combination thereof.

12. The method of claim 9 wherein the adhesive substance further comprises at least one adhesive substance selected from the group consisting of a silyl-modified polyamide, a curable resin, and any combination thereof.

13. The method of claim 9 wherein the non-aqueous tackifying agent comprises a condensation reaction of a polyacid and a component selected from the group consisting of a polyamine, a polyester, a polycarbonate, a polycarbamate, a natural resin, and any combination thereof.

14. The method of claim 12 wherein the silyl-modified polyamide comprises at least one silyl-modified polyamide selected from the group consisting of a reaction product of a silating compound and a polyamide, a reaction product of a silating compound and a mixture of polyamides, and any combination thereof.

15. The method of claim 12 wherein the curable resin comprises at least one curable resin selected from the group consisting of a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and any combination thereof.

16. The method of claim 9 wherein the aqueous dissolvable solvent comprises at least one solvent selected from the group consisting of ethanol, a butylglycidyl ether, a dipropylene glycol methyl ether, a butyl bottom alcohol, a dipropylene glycol dimethyl ether, a diethyleneglycol methyl ether, an ethyleneglycol butyl ether, methanol, butyl alcohol, isopropyl alcohol, a diethyleneglycol butyl ether, propylene carbonate, d-limonene, 2-butoxy ethanol, butyl acetate, furfuryl acetate, butyl lactate, a fatty acid methyl ester, and any combination thereof.

* * * * *